Patented Aug. 25, 1936

2,052,150

UNITED STATES PATENT OFFICE 2,052,150

DIGITALIS PREPARATION

John Torigian, Queens Village, N. Y., assignor to The Drug Products Co. Inc., Long Island City, N. Y., a corporation of New York No Drawing. Application February 8, 1935, Serial No. 5,586

8 Claims. (Cl. 167—65)

The present invention relates to an improvement in digitalis preparations and more particularly to a stable, substantially non-aqueous digitalis preparation and a process for preparing the same.

The primary object of the invention resides in the production of a digitalis extract which will remain stable and which will retain its original pharmaceutical potency for a long period of time.

Another object of the invention is to produce a digitalis extract which not only retains its pharmaceutical potency but which does not precipitate dissolved constituents upon standing.

A further object of the invention is to provide a stock digitalis extract which is always ready for immediate clinical administration regardless of the time of preparation, thus obviating the necessity of preparing "fresh" extracts for each time of use.

Other objects will appear as the description of the invention proceeds.

It has been well established that, in general, tinctures, infusions and extracts of digitalis are more liable to deteriorate than well-kept digitalis leaves. According to investigations conducted by Pittinger (J. A. Ph. A., 1918 VII, 1031), the loss of strength may vary anywhere from 0 to 12% a month, the average loss being from 20–30% a year. Pittinger states that the factors which influence the rapidity of deterioration he could not determine, but that it did not appear to depend upon the strength of the alcohol employed in the extraction.

Various attempts have been made heretofore to reduce the pharmaceutical potency loss of digitalis extracts. Tambach, in U. S. Patent 1,486,468, states that he believes deterioration is caused by the growth and development of bacteria and other organisms in the extract. He has proposed therefore to add to an aqueous infusion of digitalis leaves, glycerine and camphor, or camphor surrogates, to check the growth of the bacteria.

Tambach, in an earlier U. S. patent, numbered 943,578, describes a process for stabilizing digitalis extracts by first preparing an alcoholic extract of the digitalis leaves and then treating this extract with ether. After a precipitate is removed the extract is concentrated in vacuo and milk sugar added to produce a solid, pulverized extract. This extract is then dissolved in water with the aid of a 2% soda solution and heat.

It is known that digitalis contains a number of pharmaceutically valuable glucosides, those possessing the characteristic physiological properties of the drug being digitoxin, digitalis Kiliani and gitalin. It has been common practice, furthermore, to prepare digitalis extracts by extracting in aqueous menstrua. Both the U. S. and British Pharmacopœia set an upper limit of alcohol as about 70%, the usual extracting menstruum being four volumes of alcohol and 1 volume of water. The British Pharmacopœia designates the following extract as a "concentrated infusion":

Digitalis No. 20 powder _____gr__ 400
Alcohol (90%) _____fluid oz__ 4
Distilled water _____do__ 16

It is thus seen that digitalis extracts of the prior art have been prepared by using aqueous menstrua. Now, according to the present invention, it has been found that deterioration of digitalis extracts is due, for the most part, to a slow hydrolysis and consequent decomposition of the active glucosides extracted from the digitalis leaves. The present invention proposes, therefore, to eliminate this hydrolysis by employing a substantially non-aqueous extracting menstruum, preferably composed of a glycerine-alcohol mixture.

No water is employed to dissolve a buffer which is added to the extract in a subsequent step of preparation. Employing 95% alcohol in the glycerin-alcohol extracting menstruum provides sufficient water for this purpose. The use of a combination of a non-aqueous extracting menstruum and a buffer to hold the pH of the finished extract at a constant range has proved to prevent hydrolysis of the active glucosides over a long period of time.

The invention may be carried out in accordance with the following example, although it is to be distinctly understood that the invention is in no sense limited thereto:

An amount of powdered digitalis leaves, standardized to U. S. P. potency, representing between 150 and 175%, of the standard is defatted with benzine by any known method and the powder dried in the open air at room temperature. The drug is then moistened with a small amount of menstruum composed of 80% alcohol (95% strength) and 20% of glycerine. The thus moistened drug is then left to stand at room temperature for 4 or 5 hours, after which time it is packed into a cylindrical glass percolator and a sufficient quantity of the menstruum added to supernate the drug. The percolator is then tightly closed and the mixture allowed to macerate for 48 hours. Then the extract is allowed to percolate dropwise 40-60 drops per minute. The percolate obtained is equivalent to 150-175%, of drug strength of U. S. P. potency. To the percolate is then added 1% of glacial acetic acid and 6% of anhydrous sodium acetate. The container is tightly closed and kept at room temperature in a dark place for about 30 days.

After this preparation is filtered off the extract is ready for assaying to U. S. P. potency. Since the potency is generally above that required for U. S. P. strength it is assayed by diluting with a mixture of 80% alcohol (95% strength), acetic acid 1%, anhydrous sodium acetate 6% and glycerine q. s. to make 100%.

It is obvious that any suitable buffer solution, such as phosphoric acid-sodium phosphate solution, could be used in place of the acetic acid-sodium acetate mixture and the invention, therefore, is clearly not limited in this respect.

Practical tests show that a digitalis preparation made in accordance with the above example has proved to be stable over a long period of time and deterioration in potency is negligible. Dilution will not interfere with the stability if the above described buffer mixture is employed.

It is obvious that various details of the present invention may be varied without departing from the spirit of the invention.

It is understood that other drug preparations containing deteriorable glucosides may be extracted and kept by the same method.

What is claimed is:

1. A stable, substantially non-aqueous, alcohol-glycerine extract of digitalis.

2. A stable, substantially non-aqueous, alcohol-glycerine extract of digitalis containing a buffer.

3. A stable, substantially non-aqueous extract of digitalis in which the extracting menstruum comprises a mixture of approximately 80% alcohol of 95% strength and 20% glycerine.

4. A stable, substantially non-aqueous extract of digitalis in which the extracting menstruum comprises a mixture of approximately 80% alcohol of 95% strength and 20% glycerine and an added buffer.

5. A stable, substantially non-aqueous extract of digitalis in which the extracting menstruum comprises a mixture of approximately 80% alcohol of 95% strength and 20% glycerine and an added buffer mixture of acetic acid and sodium acetate.

6. A process for preparing a stable, substantially non-aqueous digitalis preparation from digitalis leaves which comprises extracting the drug with a substantially non-aqueous menstruum of alcohol and glycerine.

7. A process for preparing a stable, substantially non-aqueous digitalis preparation from digitalis leaves which comprises extracting the drug with a substantially non-aqueous menstruum comprising a mixture of 80% alcohol of 95% strength and 20% glycerine.

8. A process for preparing a stable, substantially non-aqueous digitalis preparation from digitalis leaves which comprises defatting the leaves, extracting the defatted leaves with a substantially non-aqueous menstruum comprising a mixture of 80% alcohol of 95% strength and 20% glycerine and then adding to the resulting extract a buffer of acetic acid and sodium acetate.

JOHN TORIGIAN.